(12) United States Patent
Miller et al.

(10) Patent No.: US 6,297,894 B1
(45) Date of Patent: Oct. 2, 2001

(54) OPTICAL SCHEME FOR HOLOGRAPHIC IMAGING OF COMPLEX DIFFRACTIVE ELEMENTS IN MATERIALS

(75) Inventors: R. J. Dwayne Miller, 21 Elmwood Ave. South, Port Credit, Ontario (CA), L5G 3J6; Gregory D. Goodno, Apt. 217, 3654 Spencer St., Torrance, CA (US) 90503

(73) Assignees: R. J. Dwayne Miller, Port Credit (CA); Gregory D. Goodno, Torrance, CA (US)

( * ) Notice: Subject to any disclaimer, the term of this patent is extended or adjusted under 35 U.S.C. 154(b) by 0 days.

(21) Appl. No.: 09/385,999

(22) Filed: Aug. 30, 1999

(30) Foreign Application Priority Data

Aug. 31, 1998 (CA) .................................................. 2246258

(51) Int. Cl.⁷ ....................................................... G03H 1/04
(52) U.S. Cl. ................................ 359/35; 359/27; 359/30; 359/31; 385/37
(58) Field of Search ................................. 359/35, 27, 30, 359/31, 34; 385/37

(56) References Cited

PUBLICATIONS

B. Saleh, "Fundamentals of Photonics", Wiley, pp. 859–860, Jan. 1991.*

* cited by examiner

*Primary Examiner*—Cassandra Spyrou
*Assistant Examiner*—Leo Boutsikaris
(74) *Attorney, Agent, or Firm*—Lynn Schumacher; Hill & Schumacher

(57) ABSTRACT

This invention discloses optical system and method for writing a refractive index pattern in a light transmissive or light absorbing sample. A light source for providing a short pulse laser beam in the femtosecond range having a low power per unit area is coupled to provide the short pulse beam to a diffractive optical element. A curved mirror collects light transmitted through or reflected from the diffractive optical element preserves an image relating to characteristics of the diffractive optical element encoded within the collected light, and directs the collected light in wavelength independent manner while preserving the image of the diffractive optical element encoded within the collected light. A rod lens demagnifies the image within the light received from the curved mirror so as to increase its power per unit area when directed to the light transmissive or absorbing sample to be permanently impressed therein.

21 Claims, 3 Drawing Sheets

OPTICAL SCHEME FOR HOLOGRAPHIC IMAGING OF COMPLEX DIFFRACTIVE ELEMENTS IN MATERIALS

FIELD OF THE INVENTION

This invention relates generally to a method and system for inducing a refractive index change in a light transmissive material, such as glass, or absorbing material such as metal, but not limited thereto.

BACKGROUND OF THE INVENTION

The manufacture of many photonics devices are based on the ability to create permanent photorefractive changes in transparent materials. For example, the development of Bragg grating reflectors within planar or linear waveguides such as single mode optical fibres is well known and has been described in various United States patents. For example, one type of a Bragg filter, is incorporated or embedded in the core of an optical fiber by a method disclosed, in U.S. Pat. No. 4,807,850. As is discussed in this patent, permanent periodic gratings of this kind can be provided or impressed in the core of an optical fibre by exposing the core through the cladding to the interference pattern of two coherent beams of ultraviolet light that are directed against the optical fibre symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating.

Other more popular methods of writing Bragg gratings in optical fibre are taught by Anderson in U.S. Pat. No. 5,327,515, and by Hill in U.S. Pat. No. 5,367,588. Both Anderson and Hill utilize a phase mask or optical phase grating. An interference pattern is generated by impinging a single light beam on the phase mask. The optical waveguide to be processed is exposed to the interference pattern, leading to the formation of a Bragg grating in the waveguide. In all of these prior art examples, an optical fibre having a Ge doped photosensitive core is irradiated with UV light of a predetermined intensity and for a predetermined duration sufficient to obtain a substantially permanent grating therein.

Although these prior art gratings provide a useful function, it would be advantageous to be able to write a grating in an un-doped light transmissive substrate or waveguide such as a typical telecommunications optical fibre, or on a slab waveguide device.

Aside from the drawback of having to provide specialty optical fibre by way of doping the core of an optical fibre so that the core becomes photosensitive to UV light, or additionally exposing such doped fibres to $H_2$ or Deuterium gas at high temperatures for a substantial duration and under substantially high pressures so that its core becomes more photosensitive, optical fibre having a grating impressed therein, in the traditional manner has be joined to the telecommunications fibre to which it is to be coupled with. Of course, $H_2$ loading and splicing fibre adds the cost and to the associated signal loss by virtue of having a coupling or splice joint between two optical fibres.

Refractive index changes written in standard UV-photosensitive optical materials such as Ge-silicate glasses are normally limited to a refractive index difference $\Delta n < 10^{-3}$. Recently, research has been directed toward elucidating the mechanism for photorefractive index changes in glasses upon exposure to UV light, and progress has been made toward developing materials with enhanced photosensitivity, e.g, hydrogen loaded specially-doped silicate glasses for waveguiding applications, or photorefractive gels for bulk diffractive elements. However each of these materials suffer in one way or another from inferior optical or mechanical properties compared with normal optical glasses. Often a curing process is required following UV exposure, which can cause shrinkage and distortion of the optically written pattern. Photrefractive gels, in particular, are limited in their application due to the non-permanent nature of the index change, with decays on a timescale of a few years.

An alternative mechanism which employs high-intensity ultra-fast pulses for creating permanent photorefractive changes in glasses has recently been explored by several groups of researchers. Such disclosure can be found in a paper by K. M. Davis, et al. in Opt. Lett. 21, 1729 (1966) and in a paper by E. N. Glezer et al in Opt. Lett. 21, 2023, (1996). Glezer et al reported refractive index changes of $\Delta n \sim 0.1$ written in fused silica using tightly focused pulses with peak intensities $\sim 10^{13} W/cm^2$. The physical process that gives rise to this refractive index change appears to be due to the creation of free electrons through multi-photon ionization of bound charges, followed by avalanche ionization and localized dielectric breakdown as these fee electrons are accelerated by the intense laser field. Phenomenologically, this leads to a localized melting and compaction of material, and a concurrent increase in the index of refraction. Owing to the extremely high intensities of light required to activate this photo-refractive mechanism, work performed in this field has used pulses that are tightly focused to near-diffraction limited spots. While this allows high-resolution spatial localization of the refractive index change to a volume on the order of $1-10 \mu m^3$, it also requires that the laser focus be scanned point-by-point throughout three dimensions to build up a complete hologrammatic pattern in the material. This is a great disadvantage for writing diffractive structures that have extended dimensions, since mechanical precision of $\lambda/100$ must be sustained across length scales up to centimeters. Over time-scales of minutes, slight drifts in ambient temperature can lead to thermal expansions or contractions that often limit the accuracy of the fabrication process. Since raster scanning is an inherently slow procedure, this technique is not well-suited toward writing large diffractive structures.

Providing a hybrid technique of utilizing standard phase masking techniques in combination with using ultra short high power femto-second pulses is problematic, since close coupling a phase mask to create an interference pattern in a sample is not feasible; the mask will experience optical damage due to the high peak intensity of light required at the sample position.

Hence, in accordance with this invention, the mask must be located remotely and the diffracted light accurately imaged onto a small spot at the sample.

Since a phase mask introduces high angular dispersion in the diffracted beams, due to the broad spectral content of ultra-short pulses, simply redirecting each individual diffracted beam so that they overlap in the sample, unfortunately results in a greatly reduced peak intensity as the spectral content of the pulse is distributed over a relatively large area.

Thus, in accordance with a preferred embodiment of this invention, an imaging system is provided that overlaps replicas of the short pulse without significant spatial or spectral aberrations, and without any element experiencing peak intensities within two orders of magnitude of those at the sample.

It is an object of this invention to overcome many of the aforementioned limitations within the prior art systems of inducing a refractive index change in a light transmissive material.

It is an object of this invention to provide a system and method for writing gratings and patterns distinguishable by way of having a plurality of refractive index changes in un-doped optical glass.

It is yet a further object of the invention, to provide a system and method for inducing a refractive index change region of a piece of light transmissive material that is not doped to become highly photosensitive.

SUMMARY OF THE INVENTION

In accordance with an aspect of the invention, there is provided, an optical system for writing a spatial modulated index pattern in a light transmissive material comprising:

a light source for generating a short pulse of laser light;

a diffractive optic element having predetermined characteristics, said element being disposed to receive the pulse of laser light;

an imaging and concentrating system disposed to receive at least some divergent light from the diffractive optic element and for concentrating the received light beams at the light beams transmissive material, the imaging and concentrating system including:

a) a curved mirror disposed to receive said at least some of the light beams from the diffractive optic element and to reflect said light beams in a substantially wavelength independent manner, and b) a concentrating/focusing element for focusing and concentrating diffracted light beams received from the curved mirror onto the light transmissive or partially absorbing material to effect a permanent refractive index change within the light transmissive material that corresponds to the spatial modulated index pattern, whereby a stable phase relationship is preserved between said at least some of the light beams at said material.

In accordance with another aspect of the invention a method is provided, for writing a spatial modulated index pattern in a light transmissive material comprising the steps of:

a) providing a short pulse of laser light;

b) providing a diffractive optic element having predetermined characteristics and directing the short pulse of laser light to be incident upon the diffractive optic element;

c) disposing an imaging and concentrating system to receive diffracted light beams from the diffractive optic element and for concentrating the received light beams at the light transmissive or partially absorbing material, step (c) including the sub-steps of:

i) capturing and reflecting diffracted light beams from the diffractive optic element by way of providing a curved mirror adjacent to the diffractive optic element and reflecting said captured light beams from the mirror in a substantially wavelength independent manner, and ii) receiving said reflected light and concentrating and focusing said reflected light received from the curved mirror onto the light transmissive or partially absorbing material to effect a permanent refractive index change within the light transmissive or partially absorbing material that corresponds to the spatial modulated index pattern whereby a stable phase relationship is preserved between said at least some of the light beams at said material.

In accordance with another broad aspect of the invention, there is provided, an optical system for writing a spatial modulated index pattern in a light transmissive or absorbing material comprising:

a light source for generating a short pulse of laser light;

an imaging and concentrating system disposed to receive at least some of the short pulse of laser light and for concentrating the received light at the light transmissive or absorbing material, the imaging and concentrating system including:

a) a curved mirror disposed to receive at least some of the light from the light source and to reflect said light in a substantially wavelength independent manner, and b) a concentrating/focusing element for focusing and concentrating light received from the curved mirror onto the light transmissive material to effect a permanent refractive index change within the light transmissive or absorbing material that corresponds to the spatial modulated index pattern.

The present invention provides a method for producing multiple light beams from an ultrafast laser with interferometric stability between the multiple beams, comprising the steps of:

providing a short pulse of laser light from an ultrafast laser;

providing a diffractive optic element having predetermined characteristics and directing the short pulse of laser light to be incident upon the diffractive optic element; and capturing and reflecting the diffracted light beams from the diffractive optic element in a substantially wavelength independent manner, whereby a stable phase relationship is preserved between said multiple light beams.

This invention provides a system and method of mapping an image from a wavelength dispersive element via a wavelength independent concentrating/focusing system to a light transmissive medium so that a feature of the wavelength dispersive element can be permanently recorded within the light transmissive medium. The system and method rely on the use of a high power short pulse of laser light at the wavelength dispersive element.

This invention further provides a system and method of mapping an image from a wavelength dispersive element via a wavelength independent concentrating/focusing system to a light transmissive or absorbing medium so that a feature of the wavelength dispersive element can be permanently recorded within a light transmissive or absorbing medium by providing a relatively short pulse of laser light, having a substantially broad beam diameter with a low power per unit area so as to prevent damage to the wavelength dispersive element, wherein the wavelength independent concentrating focusing system transforms said beam into overlapping beams along image plane where the intensity per unit area of regions along the image plane is substantially greater than the intensity per unit area of the beam at the wavelength dispersive element.

In summary, this invention provides a short pulse laser beam having a low power per unit area to a diffractive optical element. The image produced by irradiating the diffractive optical element with the short pulse laser beam is collected by a wavelength independent element and imaged and demagnified so as to increase its power per unit area when directed to the light transmissive or light absorbing sample to be permanently recorded therein.

BRIEF DESCRIPTION OF THE DRAWINGS

Exemplary embodiments of the invention will now be described in conjunction with the drawings in which.

DETAILED DESCRIPTION

Figure 1:
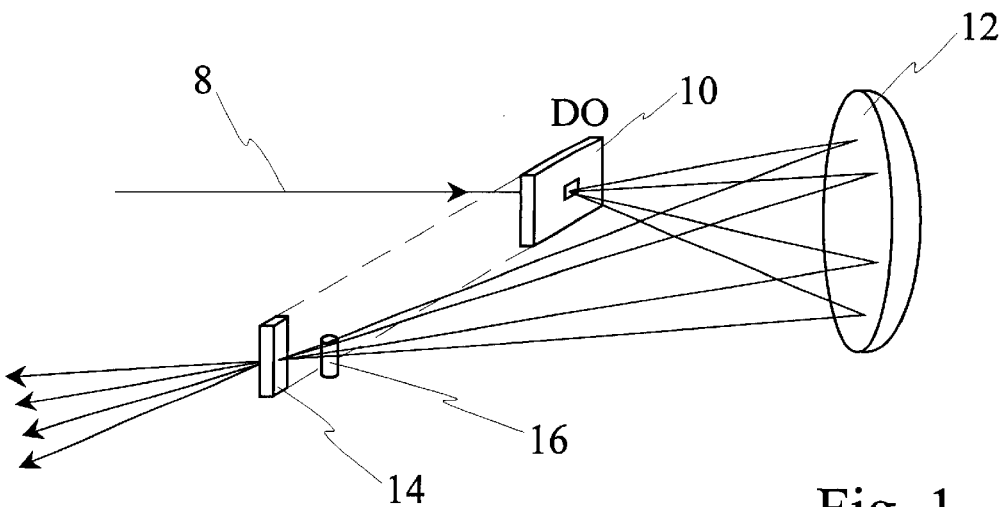
FIG. 1 is a pictorial view of an optical circuit including a spherical mirror and a cylindrical lens for writing images in an optical medium such as un-doped glass using femtosecond optical pulses.

Turning now to FIG. 1, an optical circuit representing imaging system in accordance with the invention is shown. The method of the invention will become apparent by way of explanation of the operation of the optical circuit.

At the upper left corner of FIG. 1 a line 8 representing a pulse of laser light having duration of $10^{-14}$ to $10^{-11}$ seconds is shown impinging upon a diffractive element 10. The diffractive element (DO) 10 is preferably in the form of a phase mask, for example having a predetermined surface relief pattern that will produce a wave front having predetermined characteristics at its output end face in response to an input pulse of laser light. The DO 10 is designed to produce an image at its output end face and that image is to be impressed in a light transmissive element, preferably in the form of a piece of undoped glass 14. Alternatively, instead of the phase mask 10 an amplitude mask could be utilized, however is less preferred.

Yet still, alternatively a reflective diffractive optic element can be used instead of a transmissive element. However, such a reflective element should be coated to achieve high reflectivity of the laser power; in practice, such a coating tends to smear out the surface relief pattern on the diffractive element, reducing the diffraction efficiency and limiting the throughput to the light transmissive material 14.

FIG. 1, a 300 mm radius f/1 spherical mirror 12 is disposed adjacent to the DO 10 such that the DO 10 is at the radius of curvature of the mirror 12. In operation, as the one-shot short pulse of light incident upon the DO propagates therethrough, a wave front having characteristics of the DO encoded therein, exits the DO 10 and is highly divergent. The mirror 12, provides a means of receiving the highly divergent light and reflects the light in a wavelength independent manner to the un-doped glass 14. A rod lens 16 is disposed between the mirror 12 and the un-doped sample of glass and provides a means of concentrating the light within the image by demagnifying the image. More simply stated, a substantially large beam of light having finite amount of energy in the form of a short femtosecond pulse is utilized to image the phase mask at its output end face. This larger image collected from about the phase mask is preserved and relayed in a wavelength independent manner to the lens 16, which performs a scaling function and reproduces a more intense replica of the image than was present at the output end face of the phase mask 10 upon the glass 14.

The circuit of FIG. 1 provides a system and method for holographic fabrication of one dimensional periodic structures within a transparent material by the application of one or more single-shot femtosecond pulses of light. Thus, a desired pattern dependent upon the characteristics of the DO 10, is encoded upon exposure to a single laser pulse.

Figure 3A:
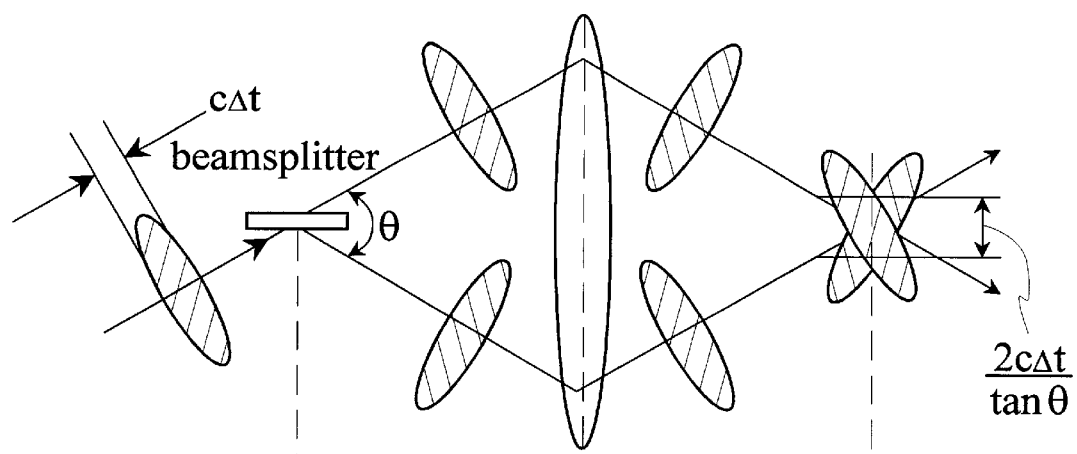
FIG. 3a is a diagram illustrating a pulse crossing geometry using a conventional beam splitter to generate two pulse replicas.
Figure 3B:
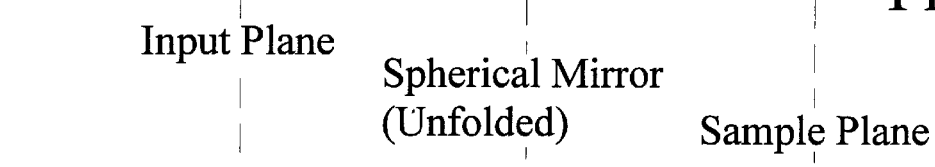
FIG. 3b illustrates the generation of pulse replicas with tilted wavefronts using a diffractive optic element.
Figure 3B:
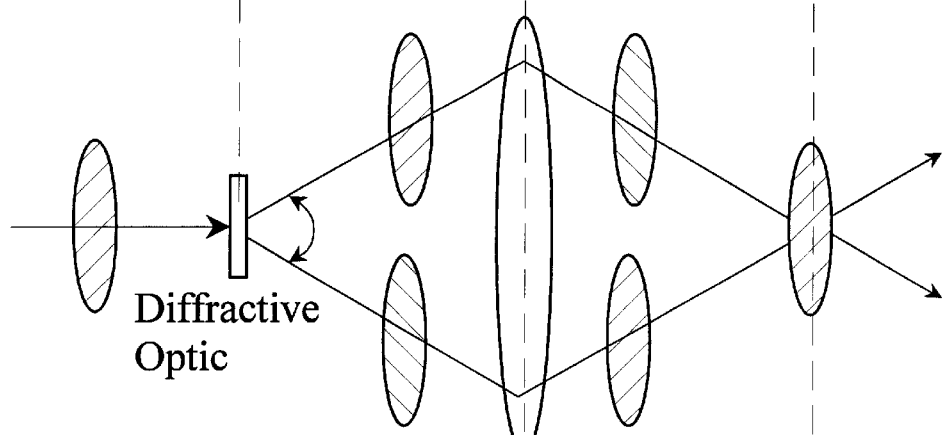

There is a consideration related to generating large-dimension interference patterns with ultra-fast pulses that that is not relevant for generating similar patterns with long pulse sources. To create an interference pattern, two phase-coherent replicas of the laser pulse must be overlapped in the sample with their wave fronts tilted with respect to one another as shown in FIG. 3b. At any point in time, an ultra-fast pulse can be viewed as a spatially localized wave packet of light, whose transverse dimensions are those of the laser beam and whose longitudinal dimension is $c\Delta t$, where c is the speed of light and $\Delta t$ the temporal pulse width. If two replicas of the short pulse are crossed at an angle, the region in which they are spatially overlapped will be limited to a transverse dimension of $\sim 2c\Delta t/\tan(\theta)$, where $\theta$ is the crossing angle between beams. For devices operating at optical or near IR wavelengths, grating periods on the order of $\Lambda \sim 1\,\mu m$ are of greatest interest, which implies $\theta \sim 1$ radian for 800 nm excitation wavelengths. The maximum spatial dimension that can be written in this case will then be limited to $\sim 40\,\mu m$. Generally, device lengths will not be able to exceed dimensions of a few tens of grating periods along the direction of the grating wave vector due to this problem. The arrangement shown in FIG. 3b is absent the geometric smearing of the pulse overlap that is present in (a). The ovals shown represent a view at an instant in time of the spatial pulse envelope, and the parallel lines inside the ovals represent the wave fronts.

Despite the limitations of the phase masking technique, the method and circuit in accordance with this invention does eliminate the short-pulse overlap problem. As an illustrative example of how this works, consider the simple situation depicted in FIG. 3(b), in which an incident short pulse is diffracted into two orders. Since the pulse envelope is not changed upon diffraction, immediately following the phase mask there is still perfect spatial overlap between the two pulse replicas. Thus, the use of phase mask 10 extends the overlap regions for single-shot writing of different structures using ultra fast pulses to dimensions on the order of the input beam diameter (~1 mm). In addition, the spatial period of the interference pattern between different diffractive structures using ultra fast pulses to dimensions on the order of the input beam diameter (~1 mm). In addition, the spatial period of the interference pattern between different diffractive orders will be independent of the source wavelength, since each spectral component will be diffracted by the mask into a slightly different direction.

The optical system and method of FIG. 1 preserves the desired features of the phase mask approach while allowing high intensities at the sample, while correcting the detrimental effects of angular dispersion arising from the mask. For simplicity, only two separate beams are shown following the mask, although this system can in general image any one-dimensional mask pattern or even more complex patterns onto the sample. An ultra-fast laser pulse in a 1 mm diameter collimated beam is incident on the phase mask, which generates pulse replicas with tilted wave packets. The mirror 12 having the DO 10 located at its centre of curvature retroreflects the diffracted light collected from the DO 10, regardless of the diffraction angle or the optical wavelength. The mirror 12 is tilted slightly off-axis to separate the incoming beams from the outgoing beams, which are directed towards the sample. At the sample 14 position, the various diffractive orders overlap and produce an interference pattern that is the inverted image of the intensity distribution following the phase mask. At high enough intensities, a hologrammatic replica of the phase mask will be created in the sample via the photorefractive mechanism discussed above. To achieve these intensities, the input beams are concentrated in one spatial dimension by a 10 mm focal length cylindrical lens, resulting in approximately 100× greater intensity at the sample than at the input mask. While tight focusing unavoidably distorts the image in the focus dimension, this is of no consequence for writing one-dimensional periodic structures.

Figure 4A:
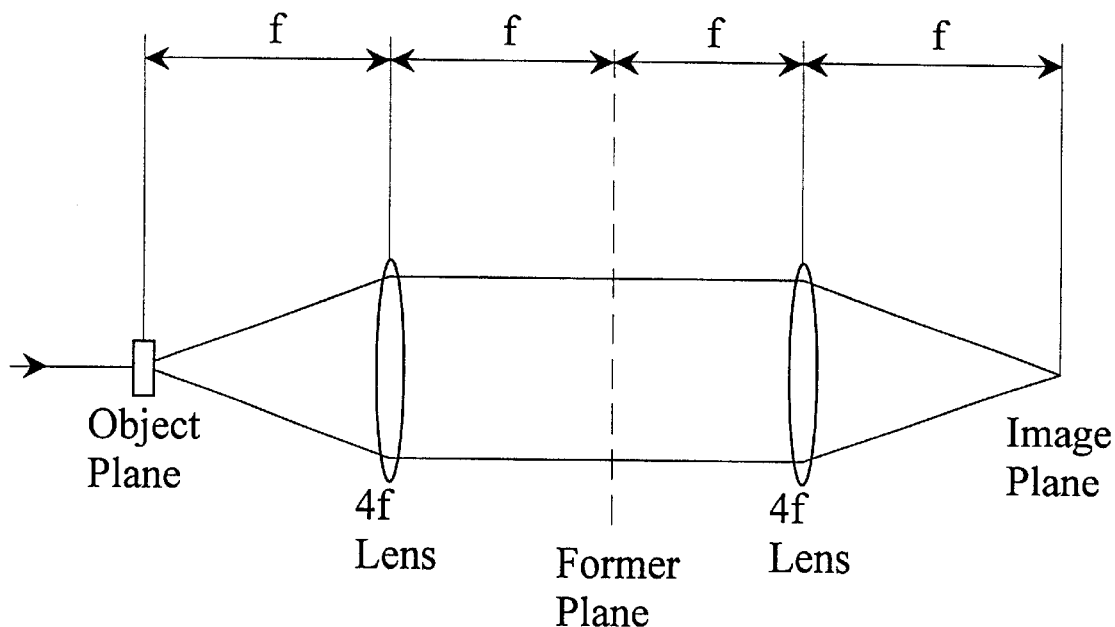
FIG. 4a is a diagram of a prior art optical 4f imaging system.
Figure 4B:
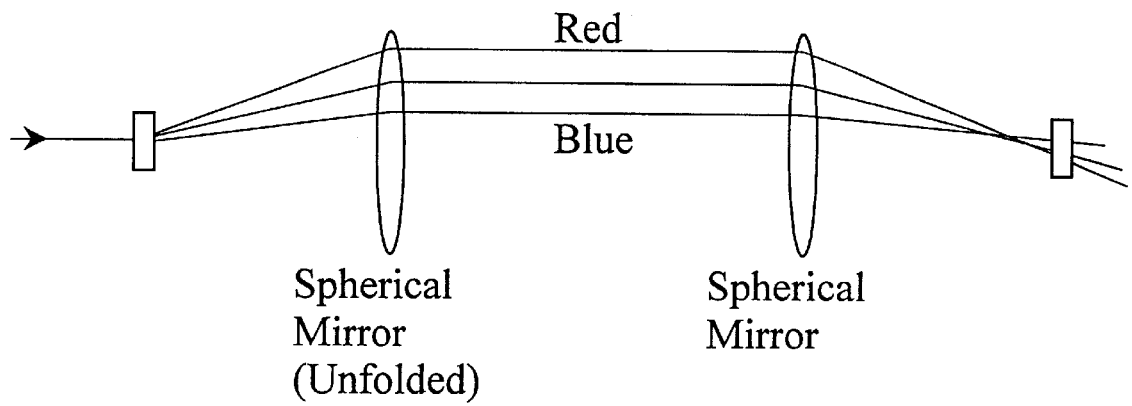
FIG. 4b is a diagram illustrating how geometric aberration within the system shown in FIG. 4a can result in wavelength dependent focusing.

This imaging system bears some analogy to a typical "4f" imaging system shown in FIGS. 4a and 4b, used in Fourier optics for image processing and pulse shaping. Like the 4f system, the arrangement used in this instance has a delta-function impulse response-function; hence the image at the input plane is perfectly reconstructed at the sample. An immediate consequence of this property is that the arrangement shown in FIG. 1 corrects for angular dispersion of the pulse spectrum that arises due to diffraction from the phase mask 10.

Advantageously, the optical system in accordance with this invention affords a high degree of interferometric stability between the various diffracted beams which is required to preserve a constant phase relationship between the beams at the sample, so that the interference pattern on the substrate does not shift appreciably over the time scale of exposure. The origin of this stability lies in the fact that all of the beams interact with the same set of optical elements, so that small mechanical fluctuations of any of the elements in the beam paths affect each beam in approximately the same manner, and thus do not appreciably perturb their relative optical path lengths.

Figure 2:
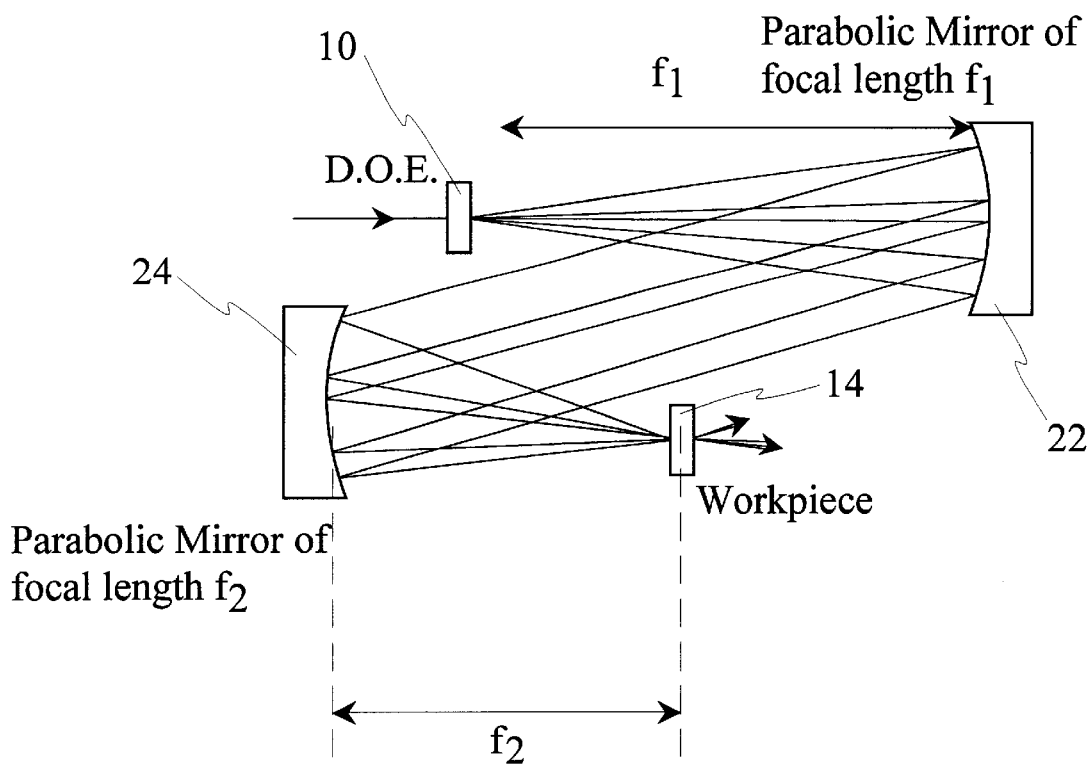
FIG. 2 is a pictorial view of an alternative embodiment of the invention wherein the spherical mirror and lens of FIG. 1 are replaced with two parabolic mirrors.

FIG. 2 illustrates an alternative and preferred embodiment of the invention which provides a simple manner of scaling the image that is to be imprinted in the un-doped glass sample. Similar to the embodiment of FIG. 1, an ultra short pulse of light having a duration of tens of femtoseconds is provided and is launched into the DO 10. A first parabolic mirror 22 having a focal length f1 is disposed to receive the diffracted light that has transmitted through is diverging from the DO 10. Of course the parabolic mirror 22 is sized to capture and reflect most of the light energy of the incident short pulse provided to and emanating from the DO 10. A second parabolic mirror 24 having a focal length f2 is disposed to receive substantially all of the reflected light containing an image characteristic of the phase mask encoded in the light, and to concentrate the image in a reduced replica, having an average greater power per unit area, sufficient to cause a refractive index change within the glass substrate that corresponds to the characteristic of the phase mask DO 10. In this embodiment, the two parabolic mirrors 22 and 24 provide essentially the same functionality provided by the curved mirror 12 and lens 16 in FIG. 1. In the instant embodiment, the parabolic mirrors are spaced by a distance (f1+f2); the magnification is f2/f1, and hence the demagnification is f1/f2. The peak intensity at the workpiece or glass substrate is $(f1/f2)^2$ times larger than at the DO 10.

In FIG. 2 the two parabolic mirrors 22 and 24 serve as the optical imaging and concentration means, whereas in FIG. 1, the spherical mirror 12 and cylindrical lens 16 provide this function.

There are numerous applications of the holographic system in accordance with this invention. Amplified Ti: sapphire laser systems are capable of emitting 100 fs pulses with 1 mJ of energy at kilohertz repetition rates. This high pulse repetition frequency lends itself to scanning the location of the interference pattern on the sample to produce larger structures. By taking advantage of existing precision optical alignment methods used in fabricating fibre Bragg gratings, photo-written gratings can be laid sequentially end-to-end with excellent control over the relative grating phase, resulting in periodic structures with dimensions far greater than those which can be fabricated on a single shot basis. In addition structures with large transverse dimensions can easily be made as well simply be scanning the beam in the dimension perpendicular to the grating wave vector. Since the high-intensity photorefractive mechanism appears to be present in virtually all common optical materials, strongly modulated structures can be made in un-doped glasses which are not UV-photosensitive. Finally, the 800 nm excitation wavelength is only very weakly absorbed in most materials, which will naturally, enable the formation of the deep structures, limited only by nonlinear pulse breakup effects that will eventually reduce the peak intensity after-millimeter propagation distances. Thus, the method presented in accordance with this invention should enable fabrication of large volume (>1 mm$^3$), bulk diffractive elements in virtually any optical material.

Numerous other embodiments may be envisaged, without departing from the spirit and scope of the invention. For example, there are also numerous applications in laser based medical treatments to which this invention can apply. For example, one can contemplate writing structures in the cornea or achieve very precise beam alignments to execute an operation.

With conventional technology for writing structures in light transmissive materials, it is very difficult to write similar patterns in light absorbing materials. Although exemplary embodiments of the invention have been described heretofore with respect to effecting a pattern in light transmissive materials, it is not exclusive to transmissive materials and encompasses writing structures in a host of other materials such as absorbing to strongly absorbing materials, for example writing complex structures in metal surfaces for profiling, where one desires a complex pattern with high spatial fidelity in a material processing step that requires high intensity pulses as are provided for by this invention.

Furthermore, the additional step of passing the light diffracted from the diffractive optic element through a spatial filter to filter predetermined orders of light may be included. For example, zero order nulling of the zeroth order light emanating from the filter may be desired.

What is claimed is:

1. An optical system for writing a spatial modulated index pattern in a material that is at least partially light transmissive or partially absorbing, comprising:
   an ultrafast light source for generating a pulse of laser light;
   a diffractive optic element having predetermined characteristics, said element being disposed to receive the pulse of laser light;

an imaging and concentrating system disposed to receive at least some divergent light beams from the diffractive optic element and for concentrating and imaging received light beams at the material, the imaging and concentrating system including:

a) a curved mirror disposed to receive said at least some of the divergent light beams from the diffractive optic element and to reflect the received light beams in a substantially wavelength independent manner, and b) a concentrating/focusing element for focusing and concentrating light beams reflected from the curved mirror onto the at least partially light transmissive or partially absorbing material to effect a permanent refractive index change within the material that corresponds to the spatial modulated index pattern, said curved mirror and said concentrating/focusing element being positioned relative to each other and to said diffractive optic element so as to affect each of the light beams focused and concentrated onto the at least partially light transmissive or partially absorbing material in substantially the same way in order to preserve a stable phase relationship therebetween.

2. An optical system as defined in claim 1, wherein the curved mirror is a spherical mirror, and wherein the concentrating/focusing element comprises a cylindrical lens for concentrating diffracted light beams at the material, and for imaging an image related to the diffractive optic element within the material.

3. An optical system as defined in claim 2, wherein the cylindrical lens concentrates the diffracted light beams at the material in a dimension orthogonal to a diffraction plane of said at least some of the divergent light beams from the diffractive optic element.

4. An optical system as defined in claim 1, wherein the curved mirror and the concentrating/focusing element comprise two parabolic mirrors, one of the parabolic mirrors having a focal length f1, the other of said parabolic mirrors having a different focal length f2.

5. An optical system as defined in claim 1 wherein the curved mirror is a first parabolic mirror having a focal length f1, and wherein the concentrating/focusing element comprises a second parabolic mirror having focal length f2 shorter than f1.

6. An optical system as defined in claim 5, wherein the first parabolic mirror is disposed to capture light beams from the diffractive optical element and to reflect said captured light beams to the second parabolic mirror which is disposed to reflect light beams reflected from said first parabolic mirror to the material.

7. An optical system as defined in claim 1, wherein the pulse has a duration of less than 10 picoseconds.

8. A method for writing a spatial modulated index pattern in a material that is at least partially transmissive or partially absorbing comprising the steps of:

a) providing a pulse of laser light from an ultrafast laser;

b) providing a diffractive optic element having predetermined characteristics and directing the short pulse of laser light to be incident upon the diffractive optic element;

c) disposing an imaging and concentrating system to receive multiple light beams diffracted from the diffractive optic element and for concentrating the light beams received at the material, step (c) including the sub-steps of:

i) said imaging and concentrating system including a curved mirror for reflecting the multiple light beams from the diffractive optic element in a substantially wavelength independent manner; and ii) said imaging and concentrating system including means for receiving the light beams reflected from the curved mirror and concentrating and focusing said light beams received from the curved mirror onto the light transmissive material to effect a permanent refractive index change within the material that corresponds to the spatial modulated light pattern, said curved mirror and said means for receiving and concentrating are positioned relative to each other so as to affect each of the multiple light beams in substantially the same way for preserving a stable phase relationship between said multiple light beams at said material.

9. A method as defined in claim 8 including the step of providing a plurality of pulses of light.

10. A method as defined in claim 8 further comprising the step of passing the multiple light beams diffracted from the diffractive optic element through a spatial filter predetermined orders of light.

11. A method of effecting a refractive index change in a sample that is at least partially transmissive or partially absorbing comprising the steps of:

providing a short pulse laser beam having a low power per unit area to a diffractive optical element so as to irradiate the diffractive optical element;

collecting light from the diffractive optical element while preserving an image relating to characteristics of the diffractive optical element encoded within the light collected; and directing the light collected in wavelength independent manner to the sample while preserving the image of the diffractive optical element encoded within the light collected and demagnifying the image within the light collected so as to increase its power per unit area when directed to the sample to be permanently impressed therein, wherein the steps of collecting the light from the diffractive optical element and directing the light collected in wavelength independent manner includes preserving a stable phase relationship between components of the light collected.

12. An optical system for writing a refractive index pattern in a sample that is at least partially light transmissive or partially light absorbing comprising:

means for providing a short pulse laser beam having a low power per unit area;

a diffractive optical element disposed to receive the short pulse laser beam;

means for collecting multiple light beams transmitted through or reflected from the diffractive optical element and for preserving an image relating to characteristics of the diffractive optical element encoded within the multiple light beams collected, and for directing the multiple light beams collected in wavelength independent manner while preserving the image of the diffractive optic element encoded within the light beams collected for demagnifying the image within the multiple light beams collected so as to increase the power per unit area when the multiple light beams collected are directed to the sample to be permanently impressed therein, and said means for collecting multiple light beams transmitted through or reflected from the diffractive optical element and for directing the multiple light beams collected includes optical elements which are positioned relative to each other and to said diffractive optic element so as to affect each of the multiple light beams collected in substantially the same way for preserving a stable phase relationship therebetween.

13. The optical system according to claim 1 wherein said diffractive optic element is a phase mask having a predetermined surface relief pattern.

14. The method according to claim 8 wherein said diffractive optic element is a phase mask having a predetermined surface relief pattern.

15. A method for producing multiple light beams from an ultrafast laser with interferometric stability between the multiple beams, comprising the steps of:

a) providing a pulse of laser light from an ultrafast laser;
   b) providing a diffractive optic element having predetermined characteristics and directing the pulse of laser light to be incident upon the diffractive optic element; and
   c) capturing and reflecting multiple light beams diffracted from the diffractive optic element in a substantially wavelength independent manner, said multiple light beams being captured and reflected using optical elements which are positioned relative to each other and to said diffractive optic element so as to affect each of the multiple light beams in substantially the same way for preserving a stable phase relationship therebetween.

16. The method according to claim 15 including focusing and concentrating said reflected light beams onto a workpiece.

17. The method according to claim 15 wherein said short pulse has a duration of less than 10 picoseconds.

18. The method according to claim 15 including a step of providing a plurality of pulses of light.

19. The method according to claim 15 wherein said diffractive optic element is a phase mask having a predetermined surface relief pattern.

20. The method according to claim 15 wherein said diffractive optic element is an amplitude mask.

21. The method according to claim 7 further comprising a step of passing the light beams diffracted from the diffractive optic element through a spatial filter to filter predetermined orders of light.

* * * * *